(12) United States Patent
Zhu

(10) Patent No.: US 9,093,855 B2
(45) Date of Patent: Jul. 28, 2015

(54) PORTABLE BATTERY CHARGER

(75) Inventor: Zuohang Zhu, Ottawa (CA)

(73) Assignee: Powerstick.com Inc., Ottawa, Ontario (CA)

( * ) Notice: Subject to any disclaimer, the term of this patent is extended or adjusted under 35 U.S.C. 154(b) by 536 days.

(21) Appl. No.: 13/473,394

(22) Filed: May 16, 2012

(65) Prior Publication Data

US 2013/0307464 A1 Nov. 21, 2013

(51) Int. Cl.
*H02J 7/00* (2006.01)
*H02J 7/35* (2006.01)
*H02J 7/34* (2006.01)

(52) U.S. Cl.
CPC ............ *H02J 7/0055* (2013.01); *H02J 7/35* (2013.01); *H02J 7/0047* (2013.01); *H02J 7/0054* (2013.01); *H02J 7/34* (2013.01); *H02J 2007/0039* (2013.01); *H02J 2007/0062* (2013.01); *Y02E 10/566* (2013.01)

(58) Field of Classification Search
None
See application file for complete search history.

(56) References Cited

U.S. PATENT DOCUMENTS

| | | | | |
|---|---|---|---|---|
| 5,698,964 A * | 12/1997 | Kates et al. | ............ | 320/164 |
| 5,734,254 A * | 3/1998 | Stephens | ............ | 320/106 |
| 5,847,541 A * | 12/1998 | Hahn | ............ | 320/111 |
| 5,929,597 A * | 7/1999 | Pfeifer et al. | ............ | 320/107 |
| 6,157,173 A * | 12/2000 | Baranowski et al. | ......... | 320/152 |
| 6,288,522 B1 * | 9/2001 | Odaohhara et al. | ............ | 320/138 |
| 7,615,965 B2 * | 11/2009 | Popescu-Stanesti et al. | . | 320/128 |
| 7,688,026 B2 * | 3/2010 | An | ............ | 320/111 |
| 7,786,696 B2 * | 8/2010 | Kim et al. | ............ | 320/112 |
| 7,843,088 B2 * | 11/2010 | Perper et al. | ............ | 307/140 |
| 7,847,520 B2 * | 12/2010 | Veselic et al. | ............ | 320/137 |
| 7,855,528 B2 * | 12/2010 | Lee | ............ | 320/107 |
| 8,080,972 B2 * | 12/2011 | Smith | ............ | 320/101 |
| 8,107,243 B2 * | 1/2012 | Guccione et al. | ............ | 361/728 |
| 8,253,373 B2 * | 8/2012 | Manor et al. | ............ | 320/107 |
| 8,558,506 B2 * | 10/2013 | Lee | ............ | 320/114 |
| 8,575,887 B1 * | 11/2013 | Pomare | ............ | 320/101 |
| 2005/0057215 A1 * | 3/2005 | Matan | ............ | 320/101 |
| 2006/0232241 A1 * | 10/2006 | Lu et al. | ............ | 320/125 |
| 2008/0061739 A1 * | 3/2008 | Lu | ............ | 320/114 |
| 2008/0303352 A1 * | 12/2008 | Hsieh et al. | ............ | 307/113 |
| 2011/0163719 A1 * | 7/2011 | Law | ............ | 320/110 |
| 2011/0273132 A1 * | 11/2011 | Khaitan et al. | ............ | 320/101 |
| 2011/0291611 A1 * | 12/2011 | Manor | ............ | 320/107 |

\* cited by examiner

*Primary Examiner* — Leigh Garbowski

(57) ABSTRACT

A portable device charger is disclosed, which is able to charge portable devices whether it is connected to an external power supply or not. The charger connects to household AC power as well as USB DC power, and further has a photovoltaic cell. It manages the input power from these three sources to charge a portable device and/or recharge the charger's battery, by supplementing the input power with battery power if the device demands more power than the input source, and charging the battery with remaining power if the device demands less power than is provided by the input source. The charger turns off the AC/DC converter and draws no power from the AC source if the battery is full and there is no attached device.

20 Claims, 4 Drawing Sheets

System Function Diagram

PORTABLE BATTERY CHARGER

FIELD OF THE INVENTION

The invention relates to battery chargers for portable devices.

BACKGROUND

Since their inception portable electronic devices like cell phones have used AC/DC adapters to charge their batteries from household AC power. USB connections are also used to charge portable devices using a DC current of approximately 5V, as well the USB can be used to exchange data between the USB source and the portable device.

U.S. Pat. No. 7,688,026 discloses a mobile charging adapter The charger uses a first input conversion to the battery voltage (perhaps on the order of 4.2V) and then in outputting, converts again from the battery voltage of 4.2 to the output voltage of 5V, reducing efficiency by the two conversions of one power. The input power cannot be output directly without conversion to the nature of the circuit, where the battery is connected directly to the input/output circuit, necessitating the multiple conversions outlined above, and thereby increasing complexity and reducing efficiency. Further, the charger will not work if the battery is damaged or near the end of its life.

Therefore there is a need in the art for a battery-powered charger which can output the input power directly, without the inefficiency of the battery connected between the input and the output.

SUMMARY OF THE INVENTION

A portable device charger is disclosed, which is able to charge portable devices whether it is connected to an external power supply or not. The charger connects to household AC power as well as USB DC power, and further has a photovoltaic (PV) cell. It manages the input power from these three sources to charge a portable device and/or recharge the charger's battery, by supplementing the input power with battery power if the device demands more power than the input source, and charging the battery with remaining power if the device demands less power than is provided by the input source. The charger turns off the AC/DC converter and draws no power from the AC source if the battery is full and there is no attached device.

The portable charger for charging a device comprises a housing, a battery contained within the housing and having a battery voltage, a battery charger between the input power source and the battery for controlling the current and voltage provided to the battery, an output power connector for providing output power to a device, an input source for providing power at a system voltage, comprising a DC power input at the system voltage; and an AC power input having an AC/DC converter to convert AC to DC power at the system voltage, a power path controller between the input source and the output power connector for directing the power from the input source to the output power connector and the battery simultaneously, which controller directs some or all of the power from the input source to the output power connector when a device is connected to the output power connector, and directs the power from the input source to charge the battery when no device is connected to the power output.

An embodiment of the charger has an input source further comprising a PV panel. Another embodiment further comprises a power point controller between the PV panel and the battery, wherein the power point controller directs power from the PV panel to the battery unless a device is connected to the output power connector wherein the power point controller directs the power from the PV panel to the device.

Another embodiment has an auxiliary PV panel and connected through the USB power input. The charger may further comprise a DC/DC converter between the battery and the output power connector for converting the battery voltage to the system voltage, wherein when a device is connected to the output power connector and the device demands further output power than is provided by the input source the output power is supplemented by the battery. In an embodiment, if the input source provides more power than the device demands, remaining power is directed by the power path controller to charge the battery. In a further embodiment, if a current draw from the AC/DC converter is above a threshold, the AC/DC converter produces an overcurrent signal for the battery charger to reduce a current draw of the battery charger.

In another embodiment the charger further comprises a USB controller for transmitting data between the charger and an input source. Also the charger may further comprise a USB controller for transmitting data between the charger and the device. If the battery cannot receive any charge and no device is connected, the AC/DC converter is turned off to save power from an AC source.

A method of charging a device battery is disclosed, comprising the steps of connecting a DC input source or an AC input source or both to a charger for providing input power; connecting a device to the charger; charging the device battery with output power from the charger; and supplementing the output power by power from a charger battery when the device demands further output power than is provided by the input source.

A method of charging a device using a charger is disclosed, comprising the steps of determining if an input source comprising an AC source or a DC source is connected; receiving power in a charger battery when the input source is connected, unless a device is also connected to an output power connector; directing power from the input source to the device when the device is connected; supplementing an output power with power from the charger battery when the device demands more power than is provided by the input source; and receiving excess power in the charger battery when the device demands less power than is provided by the input source.

The method may further comprise the steps of receiving power from a PV panel; directing the PV panel power to the device when the device is connected; and directing the PV panel power to charge the battery when no device is connected. Also, the PV panel may be an auxiliary PV panel connected to the USB input.

In an embodiment, the method may comprise one or more of the further steps of transmitting data between the charger and the input source, transmitting data between the charger and the device, directing remaining power to charge the battery when the input source provides more power than the device demands, producing an overcurrent signal for the battery charger to reduce the current draw of the battery charger when the current draw is above a threshold, and turning off an AC/DC converter when the battery cannot receive a charge and no device is connected to an output power connector.

DETAILED DESCRIPTION

Figure 1A:
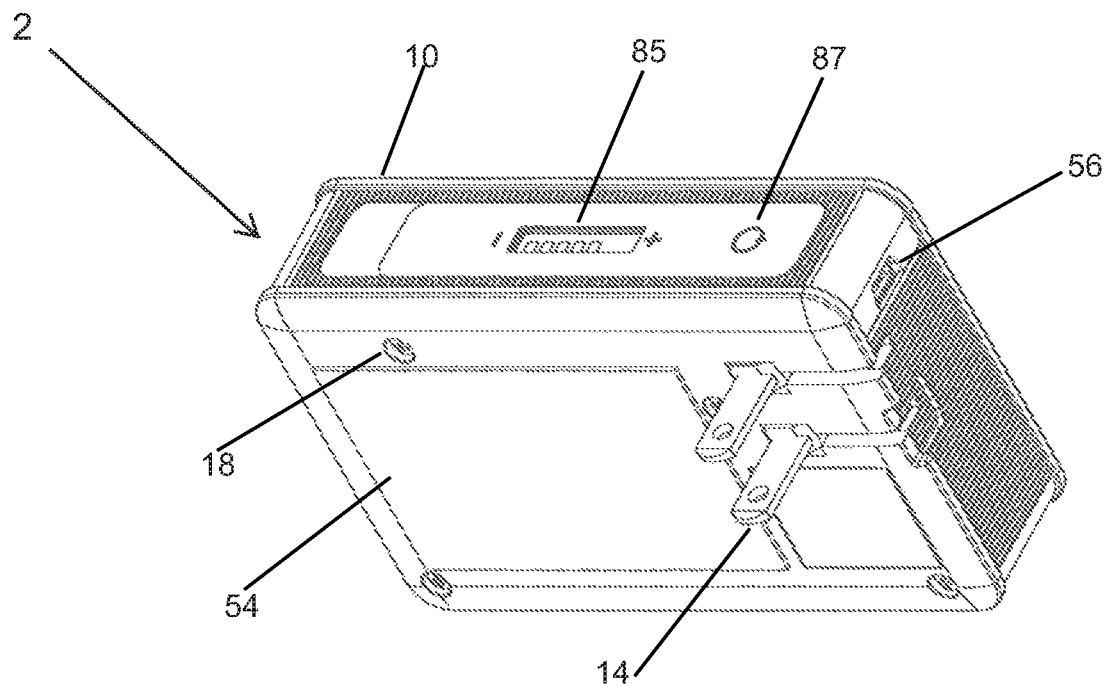
FIG. 1a is a isometric view of the external features of the portable battery charger.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

With reference to FIG. 1a, the portable battery charger 2 is shown in a perspective view and has a housing 10, a photovoltaic (PV) panel 54, AC input prongs 14 connected to an AC input 52 described below, a button 87, a USB input connector 56, and a display 85 for showing battery conditions and other information. Screws 18 or other fasteners in the art are used to hold the housing 10 together.

Figure 1B:
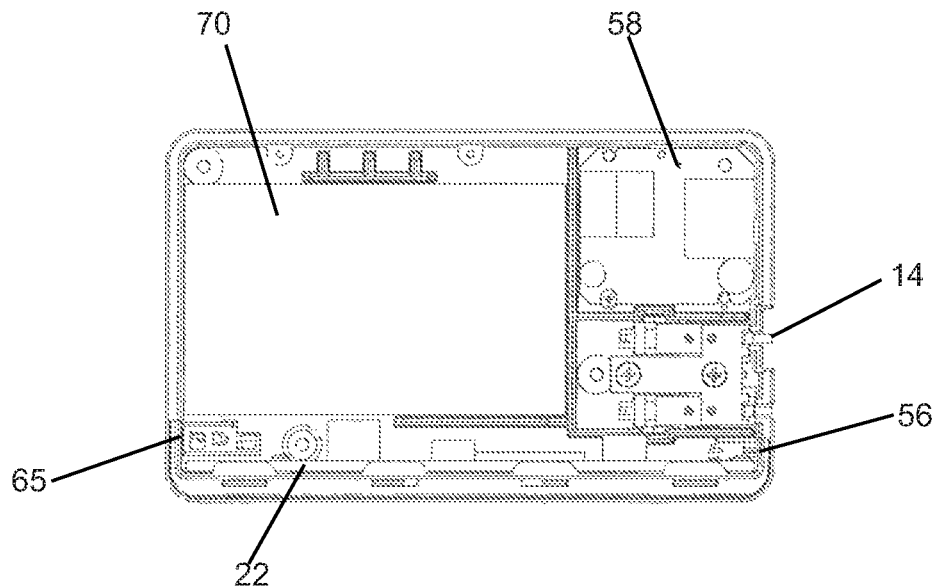
FIG. 1b is a plan view of the internal features of the portable battery charger.

With reference to FIG. 1b, one half of the housing 10 is removed to show the interior of the charger 2. The main feature of the interior is the battery 70, the AC input prongs 14, the USB input connector 56, a AC/DC converter 58, and a PCB assembly 22 which includes a microcontroller 80, battery charging and protection circuits, battery fuel gauge and output DC/DC converter (none of which are shown in this Figure). The battery charger 2 also has an output connector 65, in one embodiment in the form of a USB connector, however one skilled in the art would appreciate that one charger may have several outputs, possibly each of a different format. If the voltage requirements are the same for each output, the outputs can be set up in parallel. If the outputs voltages are different, then each output will have its own DC/DC converter to regulate the output voltage for that output. While USB v.1, 2 and 3 present a useful standard that may be used in one embodiment, other connectors may be used in other embodiments, the connectors known to one skilled in the art, for example, FireWire™ 400 and 800 and eSATA, and will be referred to inclusively in the specification as USB. The acronym "USB" in the specification refers to any DC source.

Figure 2:
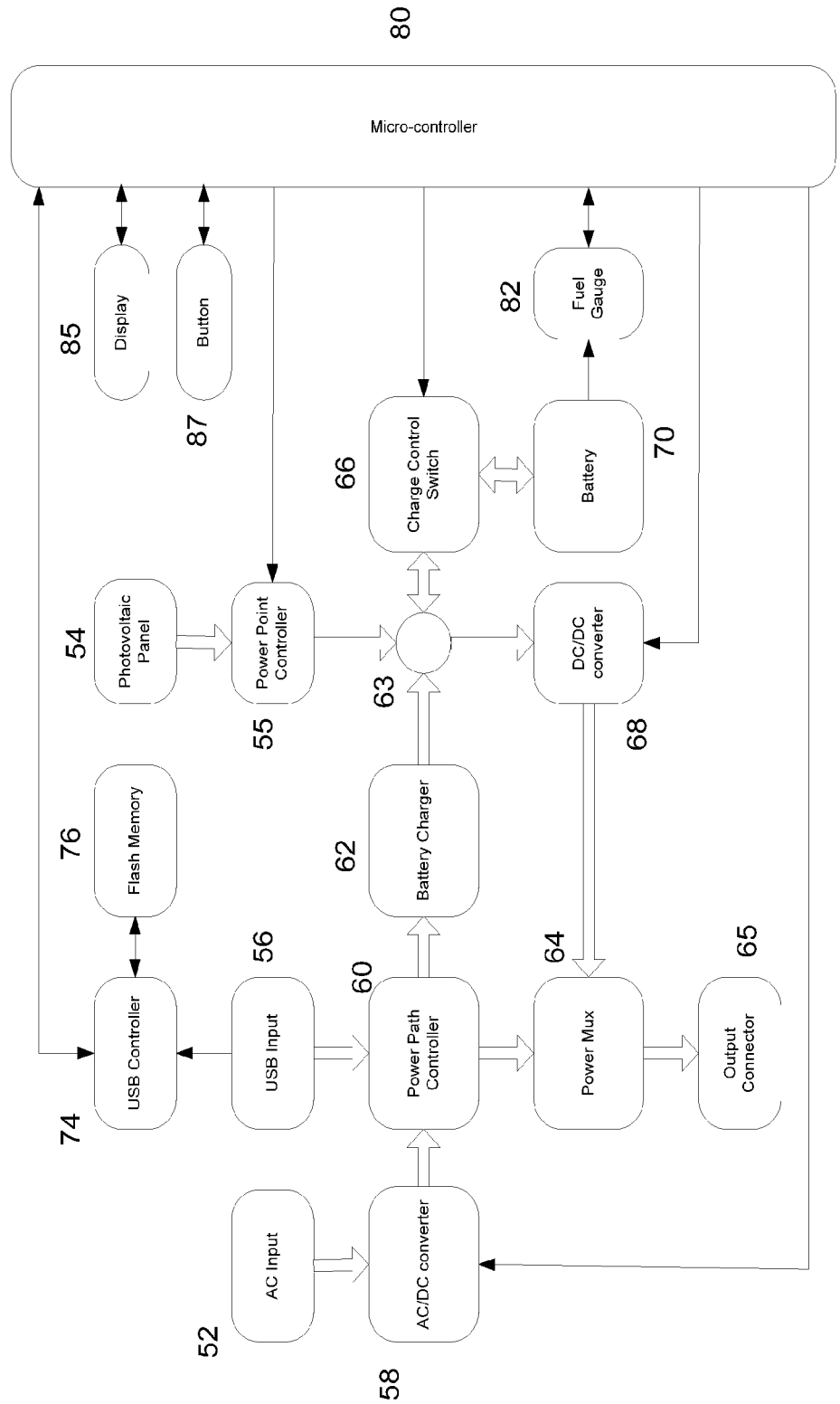
FIG. 2 is a system function diagram of the portable battery charger.
Figure 3:
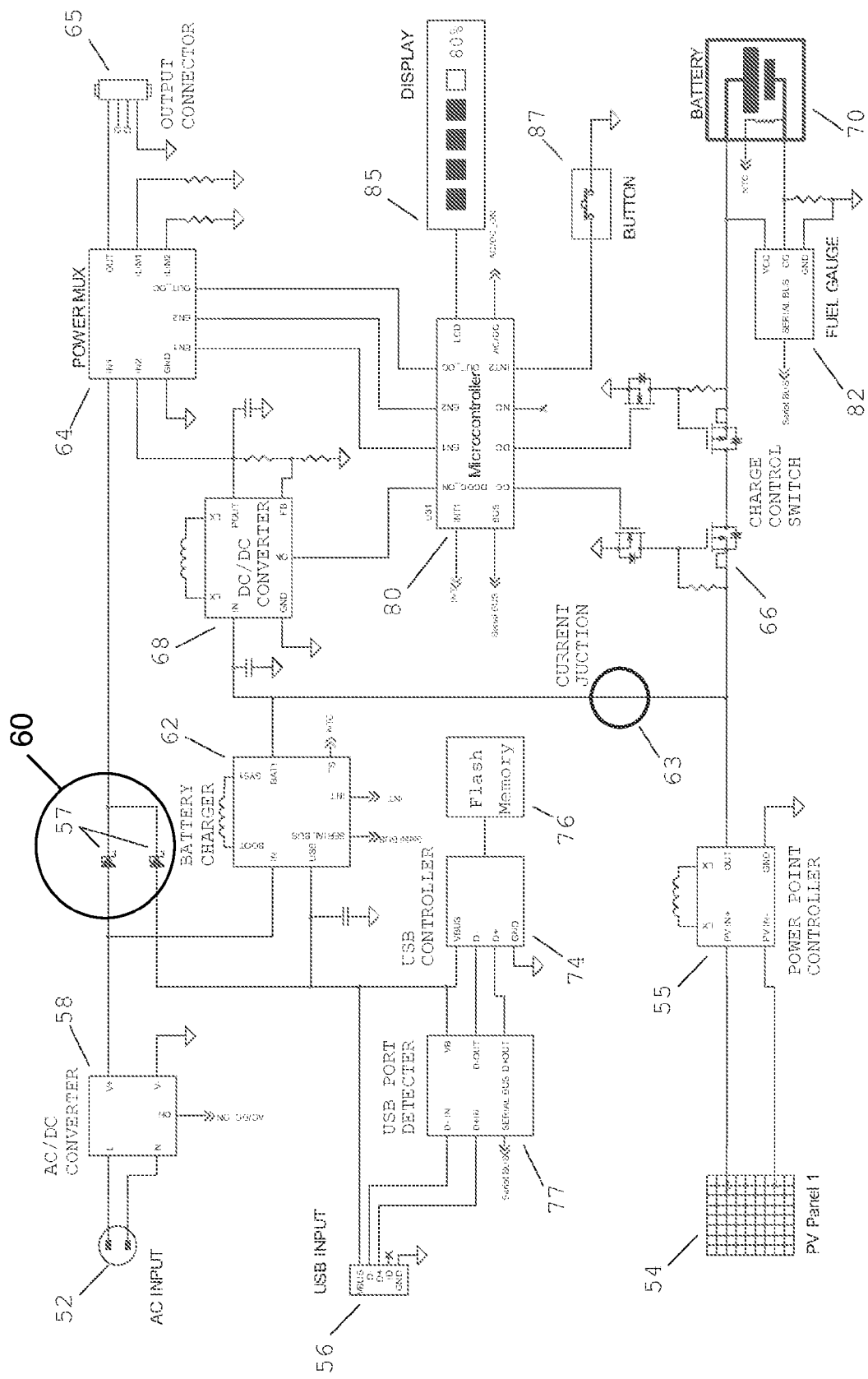
FIG. 3 is a circuit diagram of the portable battery charger.

With reference to FIGS. 2 and 3, the portable battery charger has three input sources, an AC power input 52, a USB input 56, and a photovoltaic (PV) panel 54. The AC input 52 receives power from a household socket, for example at 120V alternating current (AC) power, and this is converted to direct current (DC) power through the AC/DC power conversion module 58. DC power is provided in this way to the power path controller 60. DC power may also be received from the USB input 56, which receives standard USB power and voltage when connected to a USB source, which voltage is 5V in some embodiments. The USB input 56 may be any DC source, not limited to USB, and may include Firewire™ and other sources. These two power inputs, the AC input 52 converted to DC by the AC/DC converter 58, also 5V in some embodiments, and the DC power received from the USB input 56, are inputs to the power path controller 60. Therefore, the portable charger receives 5V input from the USB input 56 and 5V input from the AC/DC converter 58, and can directly output these voltages, without further conversion, to the output connector 65 (through the power path controller 60 and power MUX 64). Whether the power is received from the AC input 52 or the USB input 56, the power path controller 60 can either send the power received to the battery charger 62 to charge the battery, or to the power multiplexer (MUX) 64, for output through the output power connector 65.

The PV panel 54 receives sunlight and transforms it into DC electricity. The DC electricity is transmitted through the power point controller 55 to the junction 63. The PV panel 54 provides a "trickle" charge into the system of 50-100mA if mounted to the case and limited by the case size, and a higher charge current if auxiliary and not limited to a certain size. In an embodiment where an auxiliary PV panel 88 (shown in FIG. 4) is used, it may be connected by wire to the USB input 56 or to a further dedicated input (not shown). When the microcontroller 80 knows that the auxiliary PV panel 88 is plugged into the USB input 56, it will turn off battery charger 62 and turn on power switch 92, such that the PV input power is connected to power point controller 55 for conversion and output to junction 63. The auxiliary PV panel 88 is connected to the power path controller as an input to be selected between, or connected to the current location of the PV panel 54. The flow of the power received from the PV panel 54 is transmitted in the same direction as the junction 63. If the battery 70 is charging a load, such as a portable device, then current from the PV panel 54 will go to charge the load as well, otherwise it will go to the battery 70. The power point controller 55, in communication with and operated by the microcontroller 80, then transmits the power to the junction 63.

If there is a load, such as a portable device, connected to the output power connector 65, then the priority of the power path controller 60 is to charge the load, so all or some of the power from the input sources 52, 56, if there is remaining power, is sent to the output power connector 65 by means of the power MUX 64. If input power remains after the necessary power is delivered to the load, the remaining input power is diverted by the power path controller to the battery charger 62 to charge the battery. The charger 62 sends an interrupt to the microcontroller 80 with which it is connected, and the microcontroller 80 verifies the charge of the battery. If it is not charged, the charge control switch 66 is turned on and current enters the battery. The load simultaneously receives the maximum amount of current it can receive. As the load is charged, the current demanded will diminish and the current diverted to the battery grows.

If the load demands further power to that received from the input sources 52, 56, then the output power can be supplemented by the battery 70. If the load requires a greater current, the power MUX 64 gives an overcurrent signal to the microcontroller 80, which signals the DC/DC converter to output battery power. If the battery is empty, despite the overcurrent signal the microcontroller 80 will check the battery power. Once it determines there is no power available in the battery it decides not to open the DC/DC converter to provide battery power. Once power is provided by the DC/DC converter 68, current flows from the charge control switch 66 through the DC/DC converter 68, power MUX 64 to the output connector 65. As the device is charged, the current demand will become less and the battery output will also be diminished, as the battery 70 conserves energy. A constant amount is drawn from the input sources 52, 56. The power MUX 64 can be set for multiple inputs simultaneously, or individual inputs. The output power can be further supplemented by the PV panel 54 which provides additional power to the junction 63, for output by means of the DC/DC converter. If the load demands an output power that is greater than can be delivered by the input sources 52, 56 and the battery 70 has no power, the power MUX 64 will operate in overcurrent mode with a lower voltage. The addition of power by the battery 70 is typically the case where the input source 56 is USB 2.0 input, where the input source 56 does not provide sufficient power for the load (not shown), which power is then supplemented by the battery 70 to charge the load as quickly as possible.

If the AC/DC converter 58 has an overcurrent condition, then voltage is decreased to a threshold (4.7V in some embodiments) forming an overcurrent signal, and the charger 62 knows from the overcurrent signal to decrease its current draw so output voltage from the power source doesn't further decrease.

If there is no input source 52, 56, and a load is connected, once the load is connected or the button 87 pushed, the microcontroller 80 checks the battery. If there is available power in the battery, the microcontroller 80 signals the DC/DC converter 68 to open and the current flows from the battery through the DC/DC converter 68 (where the voltage is increased to 5V) and out the output connector 65.

If there is no load on the output power connector 65, input power is instead sent by the power path controller 60 to the battery charger 62. The charge control switch 66 is informed by the microcontroller 80 to which it is connected whether the battery 70 can receive power, which depends on whether the battery 70 is fully charged, or damaged, for example. If the microcontroller indicates the battery 70 can receive further power, then the charge control switch 66 sends power to the battery pack to charge it. The charger 62 determines the charging current and the battery's 70 condition. If the battery is full charged and cannot receive further power, the power is sent to the DC/DC converter 68, and then on the power MUX and the output power connector 65 for output, if a load such as a portable device (not shown) is connected. In no load is connected, the charger 62 provides a trickle charge (50mA-100mA) to the battery to maintain it.

If the battery 70 is damaged, or old, this will typically result in a lower capacity and a high internal resistance for the battery 70, and so considering the voltage drop on the internal resistance more power is needed the more aged or damaged the battery. When the microcontroller 80 determines that a battery 70 is damaged, it may use a trickle charge only to charge it, as damage can reduce the input current of the battery in addition to its capacity.

The power path controller 60 has no input from the microcontroller. It receives power from the AC power input 52 and the USB input 56. In one embodiment, it receives power from either the AC power input 52 or the USB input 56, not both simultaneously, and has a one-way circuit 57, consisting of Schottky diodes that have a 0.3V voltage drop, or ideal diodes that have less than 20 mV voltage drop for high efficiency applications, such that there is no reversal of power flow from the input sources. Due to the one-way circuit 57, power cannot enter via the AC power input 52 and exit by the USB input 56, for example. In another embodiment, the input sources are on separate circuits so their input power may be combined. Therefore the portable charger can receive power from both AC and USB sources individually or, in some embodiments, simultaneously.

When the power is sent from the battery charger 62 or the power point controller 55 into the junction 63, the microcontroller determines if there is a load on the output power connector 65. If the output power connector is connected to a load (not shown) which is drawing power, the microcontroller commands the junction 63 to route the power through the DC/DC converter 68, which adjusts the varying voltage of the battery 70 to a fixed output voltage for the load (not shown) connected to the output power connector 65. The power having adjusted voltage is then directed to the power MUX which outputs it through the output power connector 65.

If the battery 70 cannot receive a charge, as it is fully charged, and there is no load connected to the output connector 65, then no power is drawn from the input sources. The microcontroller 80 turns off the charger 62 and there is no power path to the battery, and the microcontroller 80 will turn off the AC/DC converter 58 in order to save energy from AC line. In one embodiment the PV panel 54 is constantly on so as to provide a trickle charge to the battery 70. If the battery cannot receive the charge from the PV panel 54 the excess energy is dissipated as heat.

In one embodiment, the USB input connector 56 has a signal connection to a USB controller 74, which controls data flow with a USB port through the USB input. The USB controller 74 may instead be a controller for data from another DC input, like Firewire™ for example. The output connector 65 may also communicate with the USB controller 74, such that a load may transmit data to the USB controller 74. In other embodiments there is no connection between the output connector 65 and the USB controller 74. The USB controller 74 is connected to flash memory 76, which is capable of storing and retrieving data transmitted to and from the USB controller, and the microcontroller 80. The USB controller 74 has a USB port detector 77 that communicates to the microcontroller 80 the current that can be provided by the USB port (not shown). For example, USB 2.0 produces 500 mA while USB 3.0 can deliver a current of 1.5A. The USB controller 74 is also connected to the microcontroller 80, which determines whether the USB receiving machine is connected to the USB input 56 is a dumb port (i.e. power only port or an auxiliary PV panel) or a smart port, having memory and data transmission capability. In another embodiment the flash memory is a removable memory, such as an SD™ card or microSD™ card. Power from the USB input 56 powers the USB controller 74 as well.

The battery 70 is monitored by a fuel gauge 82, which is able to determine battery conditions, for example, battery voltage, current through battery, battery temperature and battery health, the remaining power, the estimated time remaining at current draw levels. The fuel gauge 82 consists of sensors for determining the battery voltage, current and temperature. The fuel gauge 82 communicates with the microcontroller 80 which receives data from the fuel gauge 82 and makes a determination regarding the condition of the battery 70, and the microcontroller 80 determines which conditions to show on the display 85. For example, in one embodiment the microcontroller 80 calculates the amount of power remaining in the battery relative to a full charge and displays that information.

There are two protection layers for the battery 70. The first protection layer is governed by the battery charger 62 which senses the battery voltage, battery current and battery temperature (there is a temperature probe in the battery that is attached to the charger 62) and protects the battery 70 from over-voltage, over-current and over-temperature conditions, by turning off current from the battery charger 62. Based on the voltage level of the battery 70, the charger decides whether to use a trickle charge, a constant current charge or a constant voltage charge to the battery 70.

The following example assumes a 4.2V battery. The thresholds may be calculated differently for batteries of different voltages. When the battery is lower than 3V, a small current of typically fewer than 200 mA, representing a trickle charge, is used by the charger 62. When the battery voltage is greater than 3V but smaller than 4.2V, the charger 62 uses a constant current charge, providing the highest current that the battery 70 will accept. When the battery voltage is 4.2V, the charger outputs a constant voltage of 4.2V. The internal resistance reduces the battery voltage to slightly less than 4.2V, and the charger 62 provides the current the battery will accept. When the battery is nearly full, the charger 62 will provide a trickle charge current (approximately 5-10% of the battery capacity). In order to effect the appropriate thresholds the battery current is also monitored. The charger 62 has a temperature monitor, and when the battery temperature is out of the normal range, the charger stops charging. The normal charging temperature range is 0° to 45° C.

The microcontroller 80 is the next level of protection, wherein the microcontroller 80 receives signals on the battery's condition from the fuel gauge 82, and is able to monitor the voltage, current and temperature of the battery 70 and turn off or adjust the charge control switch 66 if the battery 70 experiences a voltage, current, or temperature outside a predefined range on charging. The microcontroller 80 acts to protect the battery based on the sensor input from the fuel gauge, and is able to turn off the charger 62 as necessary to protect the battery 70. For example, if the voltage is above 4.2V (for a 4.2V battery) or if the temperature is out of the acceptable range for charging (0°-45° C.), the microcontroller 80 turns the charger 62 off.

On discharging, if the battery voltage is too low (in one embodiment below 3V) then the microcontroller 80 will turn off the charge control switch 66. If an overcurrent signal is raised from fuel gauge 82 during the discharge, the charge control switch 66 is also turned off. If the temperature is out of the acceptable range (in one embodiment −15° to 65° C.) then the microcontroller 80 will turn the charge control switch 66 off.

The DC/DC converter 68 is in communication with the microcontroller 80, which determines the voltage at the battery output and controls the DC/DC converter 68 so as to provide a standard voltage to the power MUX 64. In one embodiment the output of the DC/DC converter 68 is always at 5V, unless it is in overcurrent mode where the power MUX reduces the voltage accordingly (perhaps to 4.7V), so the output current is the maximum the system can provide. This is due to the standardization of input voltages on ports, which is typically 5V. The portable charger is also useful for higher voltage devices such as laptops, where the output voltage may be standardized at a higher value.

The microcontroller 80 is connected with each of the units by serial bus, and is able to communicate with individual units as each has a unique address to identify its signals to the microcontroller 80.

With reference to the circuit diagram in FIG. 3, the PV panel 54 mounted within the case produces a trickle charge which may be sent directly to the battery or output, as described above. In a further embodiment, the charger contains circuitry to maximize the utility of the power received from the PV panel 54, including a DC/DC converter located within the power point controller. While efficient in their recommended operating ranges, the efficiency of DC/DC converters falls off dramatically at low voltages, such that there is a "threshold" to overcome before the DC/DC converter is within its most-efficient operating range. To maximize the power received from the PV panel 54 in view of the DC/DC converter's threshold, the low power output of the PV panel can be stored in a supercapacitor (not shown) first, to collect and rise above the DC/DC converter's threshold voltage. The microcontroller 80 selectively engages the DC/DC converter when the voltage and current of the supercapacitor is sufficiently high to overcome the efficiency threshold of the DC/DC converter, and charges the battery 70.

Figure 4:
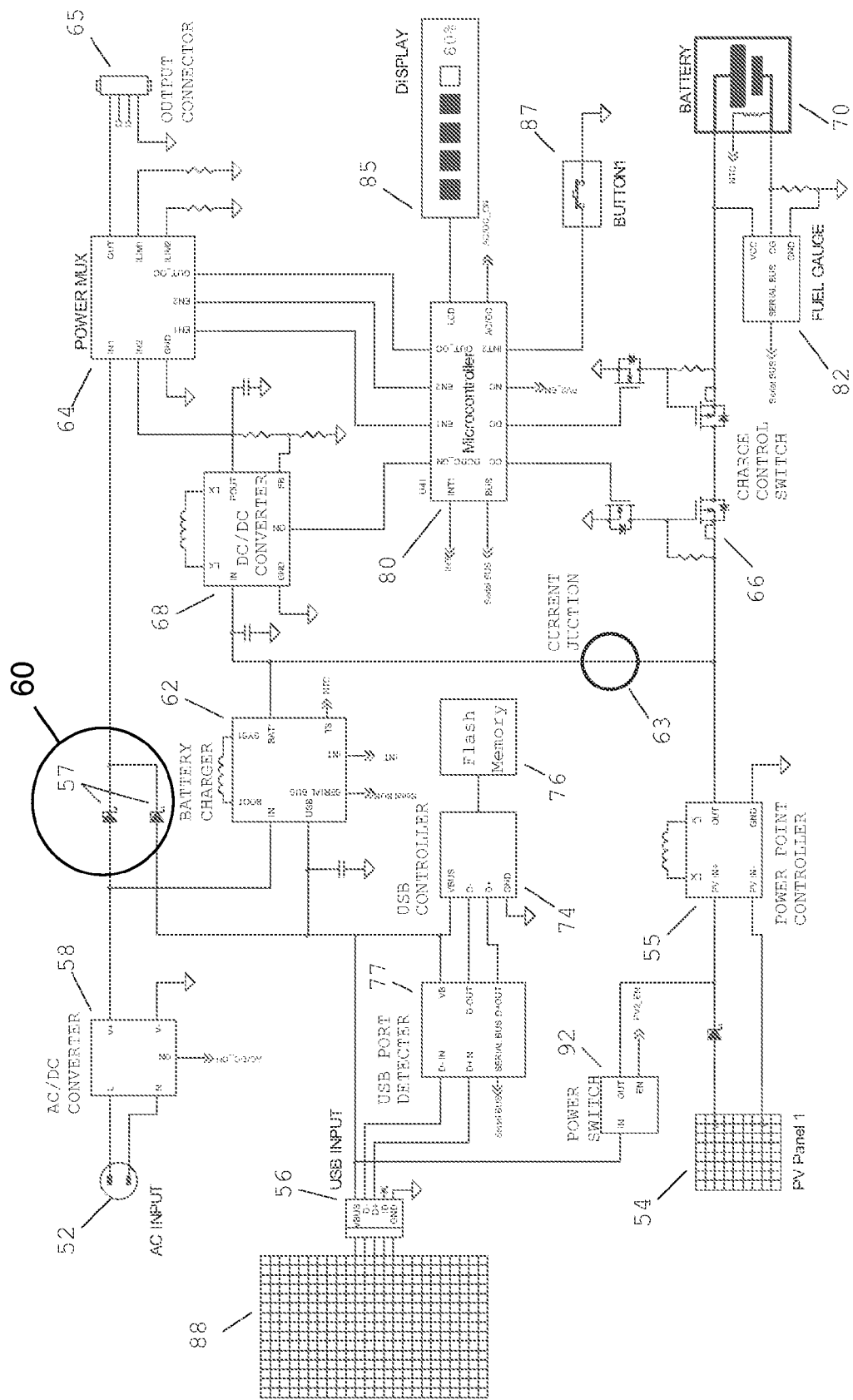
FIG. 4 is a circuit diagram of the portable battery charger in a further embodiment.

With reference to FIG. 4, in a further embodiment the charger is shown with a larger auxiliary PV panel 88 that connects through the USB input 56 by means of a USB plug (not shown). As discussed above, the auxiliary PV panel 88 is larger and can produce much more power than the PV panel 54 mounted on the case, since it is not limited to the size of the case. The higher power cannot simply be transferred to the battery as is the case with the PV panel 54. Instead, the power enters through the USB input 56, where the USB port detector 77 determines that the auxiliary PV panel is not a USB source. The external PV panel can be designed in such way that it outputs a special voltage ID through D− and D+ pins to the USB port detector 77, which transfers the voltage ID to the microcontroller 80. The microcontroller 80 reads this voltage ID and realizes the input source through USB input is an auxiliary PV panel 88. The microcontroller 80 then turns on the power switch 92 and turns off the battery charger 62 so the power from the auxiliary PV panel 88 is fed to the input of the power point controller 55.

EXAMPLES

In one embodiment, the battery is 5700 mAh. An empty battery can be charged within 8 hours by means of the AC power input, while charging by USB input takes more than 12 hours. Performance may be enhanced by increasing the AC/DC converter 58 from a 3.5 W to a 7.5 W rating, and to insert a battery charger 62 that is more efficient, for example moving from a linear charger to a switching charger. To illustrate the example, the linear charger, while its input and output current are same (1.0A), the voltage difference between input voltage (5V) and the output voltage (battery voltage 3-4.2V) will be on the linear charger and wasted as heat. The average charging efficiency is only about 70%. The switching charger has an efficiency of more than 90%, and is able to vary the voltage and current. If the input to the charger is 5V and 1A, and the battery is at 3V, then 3V and 1.5A may be provided to the battery 70 by the switching charger, resulting in faster charging than the linear charger.

As an example, in an embodiment where the PV panel is mounted on the case of the charger, and is therefore limited in size to 2"×2" for example, the PV panel outputs 100-500mW in bright light, a trickle charge of 50mA at 4.5V. Where an auxiliary PV panel is used, which may be of any conceivable size, the power output may be in the range of 3-5W, for a current of 0.6-1 A at 5V.

From the foregoing, it will be observed that numerous variations and modifications 20 may be effected without departing from the spirit and scope of the invention. It is to be understood that no limitation with respect to the specific apparatus illustrated herein is intended or should be inferred. It is intended to cover by the appended claims all such modifications as fall within the scope of the claims.

What is claimed is:

1. A portable charger for charging a device, the charger comprising:
   (a) a housing;
   (b) a battery contained within the housing and having a battery voltage;
   (c) an output power connector for providing output power to a device;
   (d) an input source for providing power at a system voltage, comprising
      (i) a DC power input at the system voltage, and
      (ii) an AC power input having an AC/DC converter to convert AC to DC power at the system voltage;
   (f) a power path controller connected to the input source, for controlling input power; and (g) a power multiplexer connected between the power path controller and an output power connector, configured to control output power, wherein the power path controller directs the power from the input source to the output power connector and the battery simultaneously, which power path controller directs at least some of the power from the input source to the output power connector when a device is connected to the output power connector; and wherein the power multiplexer directs power simultaneously from the power path controller and the battery to the output power connector.

2. The portable charger of claim 1, wherein the input source further comprises a photovoltaic panel.

3. The portable charger of claim 2, further comprising a power point controller between the PV panel and the battery, wherein the power point controller directs power from the photovoltaic panel to the battery unless a device is connected to the output power connector wherein the power point controller directs the power from the PV panel to the device.

4. The portable charger of claim 2, wherein the PV panel is auxiliary and connected through the USB power input.

5. The portable charger of claim 1, further comprising a DC/DC converter between the battery and the output power connector for converting the battery voltage to the system voltage, wherein when a device is connected to the output power connector and the device demands further output power than is provided by the input source the output power is supplemented by the battery.

6. The portable charger of claim 1, further comprising a battery charger between the input source and the battery for controlling the current and voltage provided to the battery wherein if the input source provides more power than the device demands, remaining power is directed by the power path controller to the battery charger to charge the battery.

7. The portable charger of claim 6, wherein if a current draw from the AC/DC converter is above a threshold, the AC/DC converter produces an overcurrent signal for the battery charger to reduce a current draw of the battery charger.

8. The portable charger of claim 6, wherein the battery charger is turned off if the voltage, current or temperature is outside of an acceptable range, to protect the battery.

9. The portable charger of claim 8, further comprising a microcontroller configured to monitor the voltage, current or temperature of the battery, and control the battery charger.

10. The portable charger of claim 1, further comprising a USB controller for transmitting data between the portable charger and the device.

11. The portable charger of claim 1, wherein if the battery cannot receive any charge and no device is connected, the AC/DC converter is turned off to save power from an AC source.

12. The portable charger of claim 1, wherein the power path controller directs at least some of the power having a power voltage from the input source to the output power connector without reducing the power voltage to the battery voltage.

13. A method of charging a device battery, comprising the steps of
(a) connecting a DC input source and an AC input source to a charger for providing input power;
(b) connecting a device to the charger;
(c) charging a device battery of the device with input power from the charger;
(e) a multiplexer providing an overcurrent signal when the device battery demands exceed the input power; and
(f) multiplexing output power with power from a charger battery when an overcurrent signal is provided.

14. The method of claim 13, further comprising the step of:
(f) directing remaining power to charge the battery when the input source provides more power than the device demands.

15. The method of claim 13, comprising the further step of:
(f) producing an overcurrent signal for the battery charger to reduce the current draw of the battery charger when the current draw is above a threshold.

16. The method of claim 13, further comprising the step of:
(f) turning off an AC/DC converter when the battery cannot receive a charge and no device is connected to an output power connector.

17. The method of claim 13 further comprising the step of:
(a) receiving excess power in the charger battery when the device demands less power than is provided by the input source.

18. The method of claim 17, wherein the step of receiving comprises the step of receiving power from a photovoltaic panel, and wherein the step of directing comprises the steps of directing the PV panel power to the device when the device is connected; and directing the PV panel power to charge the battery when no device is connected.

19. The method of claim 18, wherein the PV panel is an auxiliary PV panel connected to the USB input.

20. A method of charging a device battery, comprising the steps of
(a) connecting one or more input power sources to a charger for providing input power;
(b) connecting a device to the charger;
(c) charging a device battery of the device with input power from the charger;
(d) a multiplexer providing an overcurrent signal when the device battery demands exceed the input power; and
(e) multiplexing output power with power from a charger battery when an overcurrent signal is provided.

* * * * *